United States Patent [19]

Nakamura et al.

[11] Patent Number: 5,747,900
[45] Date of Patent: May 5, 1998

[54] ELECTRIC MOTOR WITH AN AIR-COOLING SYSTEM

[75] Inventors: Kosei Nakamura; Yukio Katsuzawa; Junichi Nagai, all of Yamanashi, Japan

[73] Assignee: Fanuc Ltd., Yamanashi, Japan

[21] Appl. No.: 542,901

[22] Filed: Oct. 13, 1995

[30] Foreign Application Priority Data

Nov. 4, 1994 [JP] Japan .................. 6-271206

[51] Int. Cl.$^6$ .................. H02K 9/00; H02K 1/32
[52] U.S. Cl. .................. 310/58; 310/62; 310/64
[58] Field of Search .................. 310/51, 89, 58, 310/59, 62, 63, 64, 65

[56] References Cited

U.S. PATENT DOCUMENTS

| | | | |
|---|---|---|---|
| 4,406,959 | 9/1983 | Harano et al. | 310/58 |
| 4,680,493 | 7/1987 | Ziegler et al. | 310/62 |
| 4,866,320 | 9/1989 | Schulz | 310/89 |
| 4,908,538 | 3/1990 | Geberth, Jr. | 310/59 |
| 5,019,737 | 5/1991 | Bruno | 310/89 |
| 5,397,950 | 3/1995 | Norbury, Jr. et al. | 310/91 |
| 5,559,380 | 9/1996 | Nakamura et al. | 310/64 |

*Primary Examiner*—Steven L. Stephan
*Assistant Examiner*—Michael J. Wallace, Jr.
*Attorney, Agent, or Firm*—Nikaido Marmelstein Murray & Oram LLP

[57] ABSTRACT

An electric motor includes a covering member for covering the outer periphery of a stator core, to improve the cooling efficiency of an air-cooling system of the motor. The covering member is fixed to a stator while defining a cavity therebetween in fluidic communication with air passages formed directly in the stator core. When an blower unit mounted on the motor operates, an ambient air surrounding the motor is introduced into the cavity, and then flows from the cavity into the air passages, so as to actively absorb heat generated in the stator from the outer peripheral surface of the stator core and the tubular wall surfaces of the air passages. Thereafter, the air is discharged from the air passages out of the motor.

5 Claims, 8 Drawing Sheets

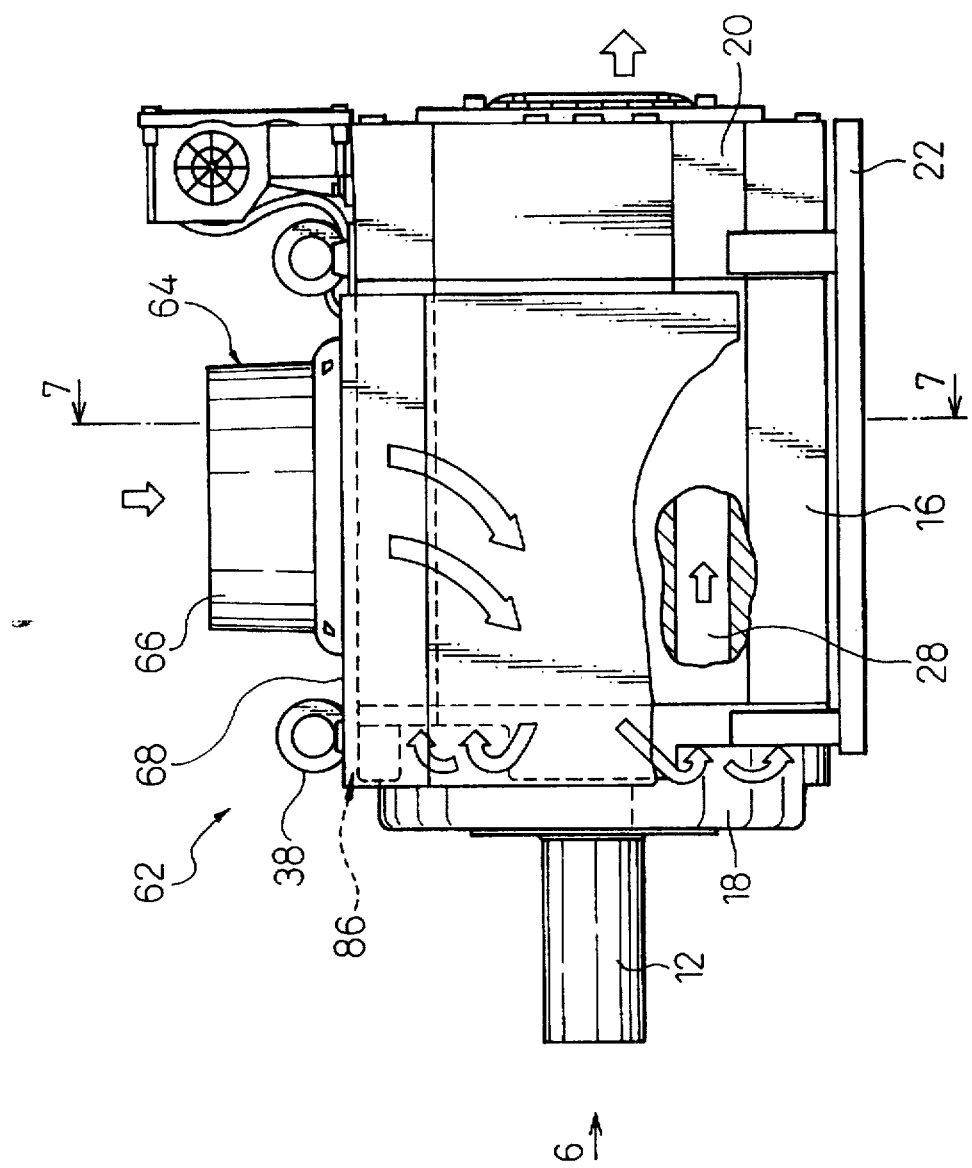

ELECTRIC MOTOR WITH AN AIR-COOLING SYSTEM

BACKGROUND OF THE INVENTION

1. Field of the Invention

The present invention relates generally to an electric motor with a cooling system, and particularly to an electric motor with an air-cooling system which includes air passages formed directly in a stator core and a blower unit for introducing ambient air, surrounding the motor, into the air passages.

2. Description of the Related Art

Conventionally, electric motors include various systems for cooling a stator, which can absorb heat generated due to iron loss in a stator core or copper loss in a winding, and thus can cool the stator, so as to restrict a temperature rise of the motor when it is running and to improve the power rating thereof. Especially, in a small electric motor having no casing for encircling and carrying an outer periphery of a stator core, a cooling system has been known, wherein a stator core composed of stacked magnetic laminations, i.e., a laminated stator core, is directly provided with axially extending cooling medium passages, and a cooling medium absorbs heat of the laminated stator core directly from the wall surfaces of the passages. When the cooling medium of this cooling system is air, a constitution wherein a blower unit such as a fan or blower is mounted in the motor and operates to actively blow an ambient air surrounding the motor into the cooling medium passages, has been widely used. In this kind of air-cooling system, the air can flow through the respective cooling medium or air passages, and heat is exchanged between the core material and the air on the tubular wall surfaces of the respective passages.

In an electric motor with the above-mentioned air-cooling system, it is effective for improving the air cooling function to increase the total area of the wall surfaces of the air passages, the wall surfaces forming a heat exchange surface lying between the core material and the air. In this respect, an increased number of the passages or an increased sectional area of each passage can increase the total area of the wall surfaces of the passages. However, in the motor having a limited dimension, the number or sectional areas, i.e., the volume, of the passages should be restricted from the viewpoint of maintaining a sufficient sectional area or volume of the stator core so as to be a good and effective magnetic path.

Further, even if the air-cooling efficiency could be improved as much as possible under such a restricted condition, it is difficult to cool the stator core to a temperature lower than that of an atmospheric air surrounding the motor. Therefore, in the case of the electric motor with no casing and having air passages directly formed in the stator core, the heat radiated from the outer surface of the stator core to the surroundings of the motor will have an undesirable influence, such as a heat deformation, on an environment such as a structure on which the motor is mounted.

SUMMARY OF THE INVENTION

It is therefore the object of the invention is to provide an electric motor with an air-cooling system which includes air passages formed directly in a stator core and a blower unit for introducing ambient air, surrounding the motor, into the air passages, and which can easily increase the area of a heat exchange surface to improve the air-cooling efficiency and also can reduce the heat radiation from the stator core as much as possible.

In accordance with the present invention, there is provided an electric motor, with an air-cooling system, comprising a rotor; a stator having a stator core encircling the rotor with a gap being defined therebetween; a plurality of air passages formed directly in the stator core and extending generally axially along an outer periphery of the stator core; a covering member fixed to the stator and at least partially covering an outer peripheral surface of the stator core so as to define a cavity at least partially encircling the stator core in fluidic communication with the air passages; and a blower unit for blowing ambient air, surrounding the motor, into the cavity, whereby the air flows from the cavity into the air passages to absorb heat generated in the stator and then is discharged from the air passages out of the motor.

In the air-cooling system with above-mentioned structure, the heat generated in the stator when the motor is running is directly and actively absorbed from the outer peripheral surface of the stator core and the wall surfaces of the air passages by the air flowing in the cavity and the air passages. In this respect, since the air is first introduced into the cavity, the outer peripheral surface of the stator core is covered by not only the covering member but also an air having a relatively low temperature, i.e., temperature similar to that of the ambient air. Therefore, the heat radiated from the stator core can be reduced.

In the preferred aspect of the present invention, the cavity defined between the stator core and the covering member may open to an exterior of the motor at only a position adjacent to a rear axial end of the stator core, and may be communicated with the air passages at a position adjacent to a front axial end of the stator core, whereby the air flows from a rear axial end of the cavity to a front axial end of the air passages and then is discharged from a rear axial end of the air passages.

Further, it is advantageous that an elastic element is interposed between the stator and the covering member.

The stator may include a pair of supporting members arranged at respective axial ends of the stator core, the supporting members being provided with axially extending through holes in fluidic communication with respective air passages, so that the cavity is communicated with the air passages through the through holes of one of the supporting members.

Also, it is preferred that the blower unit is disposed at a lateral side of the motor and is fixedly carried by the covering member.

BRIEF DESCRIPTION OF THE DRAWINGS

The above and other objects, features, and advantages of the present invention will become more apparent from the following description of preferred embodiments in connection with the accompanying drawings, in which:

FIG. 5 is a partially cut-out side view of an electric motor with an air-cooling system according to another embodiment of the present invention;

DESCRIPTION OF THE PREFERRED EMBODIMENT

Figure 1:
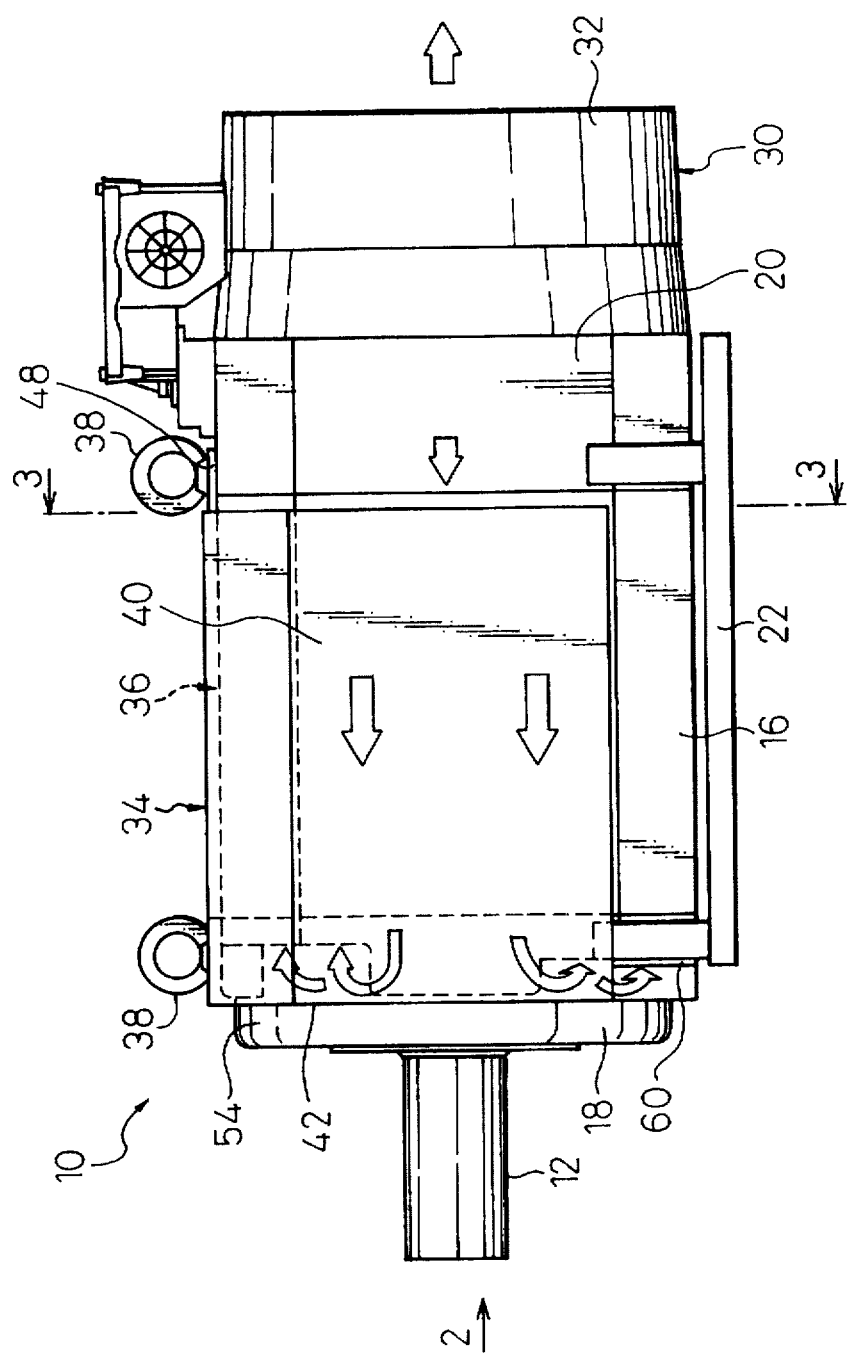
FIG. 1 is a schematic side view of an electric motor with an air-cooling system according to an embodiment of the present invention.
Figure 2:
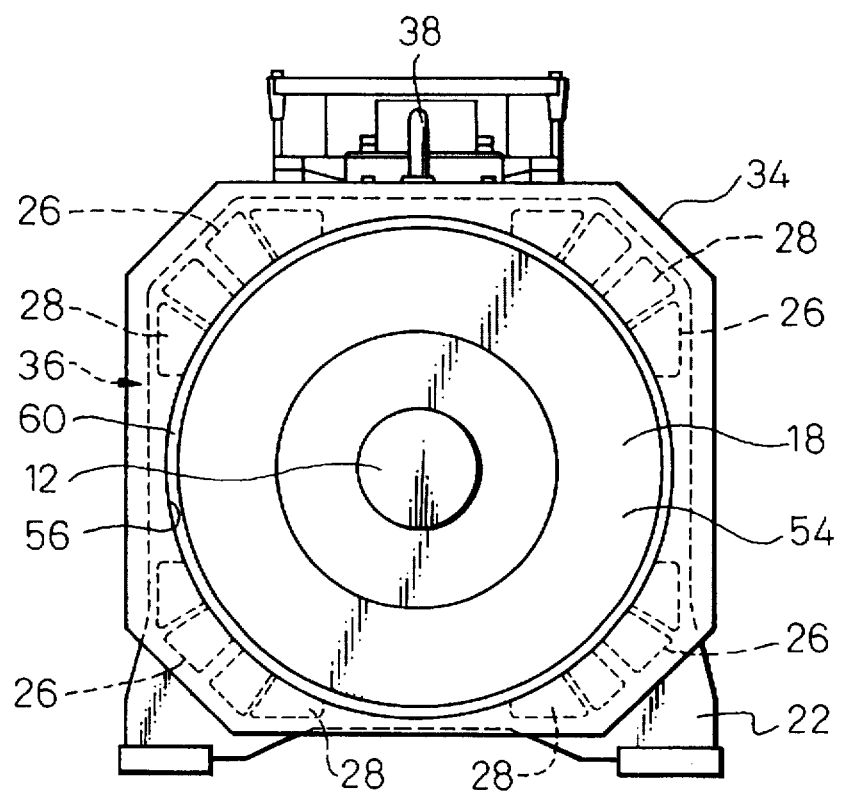
FIG. 2 is an end view of the motor of FIG. 1, showing from an arrow 2 of FIG. 1.
Figure 3:
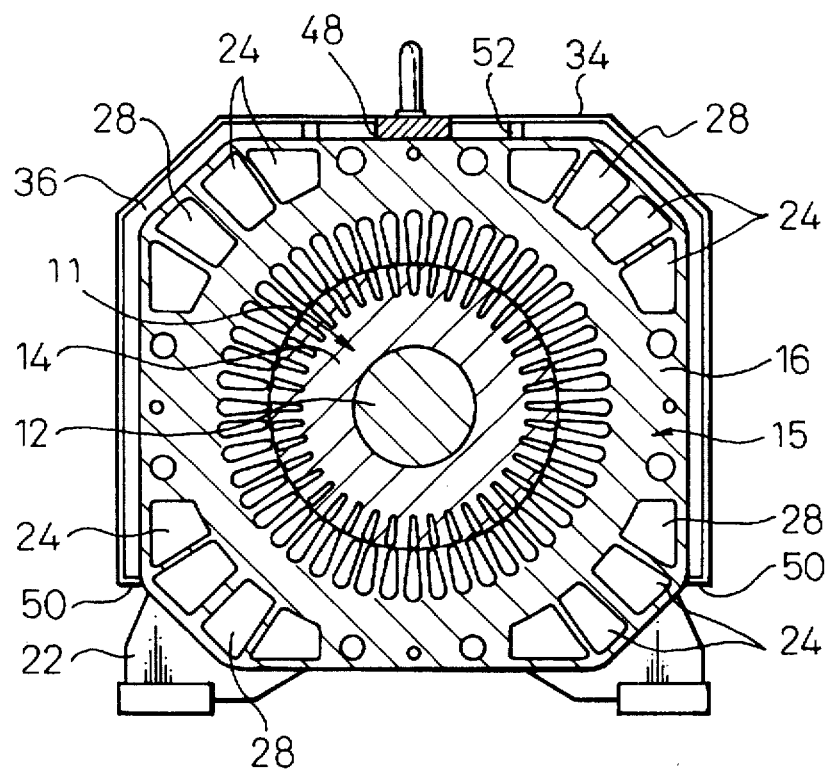
FIG. 3 is a sectional view of the motor of FIG. 1, taken along a line 3—3 of FIG. 1.

Referring now to the drawings, wherein like reference numerals designate like or corresponding parts throughout the several views, FIGS. 1 to 3 show an electric motor 10 with an air-cooling system according to an embodiment of the present invention. The motor 10 includes a rotor 11 having a rotor core 14 fixed to a shaft 12, a stator 15 having a stator core 16 encircling the rotor core 14 while defining a gap therebetween, and front and rear support members 18, 20 disposed at both axial ends of the stator core 16 to hold the stator core 16 therebetween. The front and rear support members 18, 20 also rotatably support the shaft 12 through bearings (not shown). As shown in the drawings, the motor 10 is a floor-type motor, and has bases 22 secured to the front and rear support members 18, 20.

The stator core 16 is composed of stacked magnetic laminations such as magnetic steel sheets, and is provided with a plurality of through holes 24 extending axially between axial ends of the stacked magnetic laminations along the outer periphery thereof in a peripherally spaced relationship. The through holes 24 may be positioned symmetrically to the axis of the stator core 16. The front and rear support members 18, 20 are also provided with a plurality of through holes 26 which extend axially between axial ends of the support members and are in fluidic communication with the respective through holes 24 of the stator core 16. FIG. 2 shows only the through holes 26 of the front support member 18 by a dashed line. In this manner, an axially extending plurality of air passages 28 are defined by joining the through holes 24 of the stator core 16 to the corresponding through holes 26 of the front and rear support members 18, 20.

A blower unit 30 is mounted at the rear side (right in FIG. 1) of the rear support member 20 to blow ambient air, surrounding the motor, as a cooling medium into the air passages 28. A casing 32 of the blower unit 30 is fixedly connected to the rear support member 20. When a fan or blower (not shown) of the blower unit 30 operates, the air flows in the air passages 28 from the front side to the rear side of the motor, and is discharged through a rear end wall, which preferably is formed as a mesh, of the casing 32 to the exterior of the motor.

The motor 10 of the present invention includes, in addition to the above mentioned structure, a covering member 34 for at least partially covering the outer periphery of the stator core 16, so as to improve the cooling efficiency of the air-cooling system. The covering member 34 is an element separated from the stator core 16 and the front and rear support members 18, 20, and is fixed to the front and rear support members 18, 20 by fixing means such as eye bolts 38, while defining a cavity 36 between the covering member 34 and the outer periphery of the stator core 16, the cavity 36 being in fluidic communication with the air passages 28. In addition to the eye bolts 38, other conventional bolting elements such as hexagon head bolts may be used at other locations.

Figure 4A:
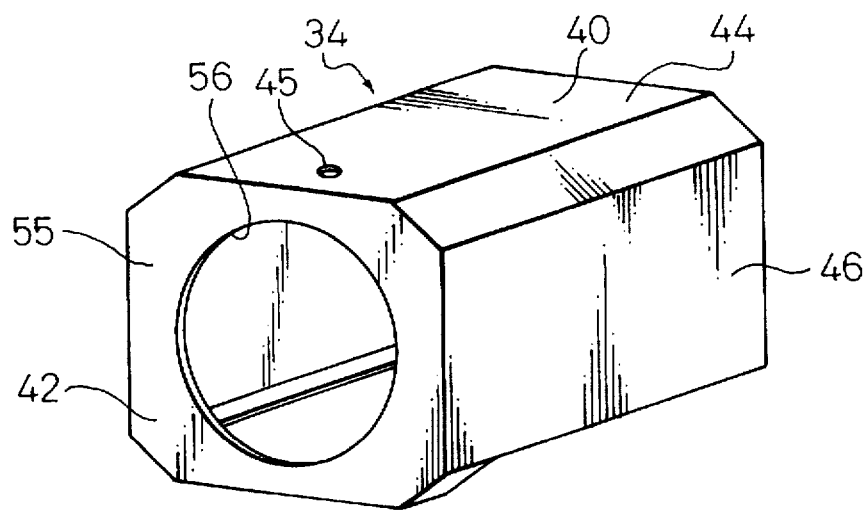
FIG. 4a is a frontside perspective view of a covering member used in the motor of FIG. 1.
Figure 4B:
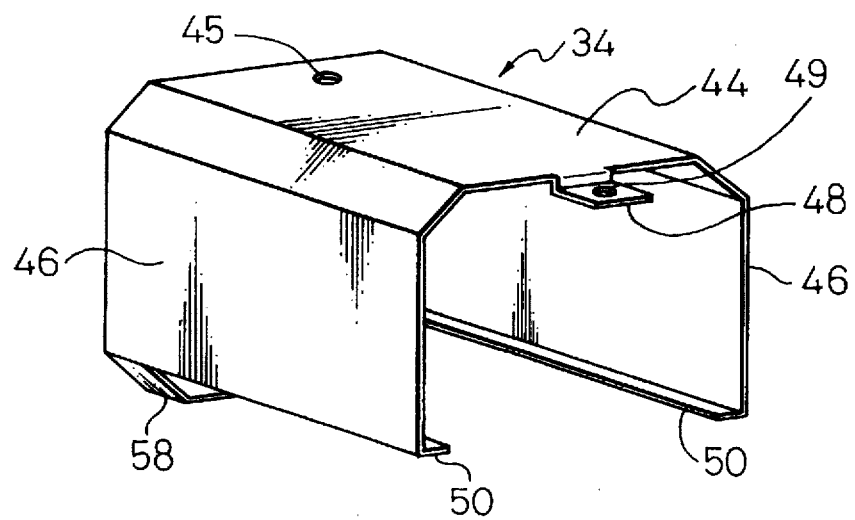
FIG. 4b is a rearside perspective view of a covering member used in the motor of FIG. 1.

As shown in FIGS. 4a and 4b, the covering member 34 includes a first part 40 with a generally U-shape in section which is adapted to cover the top and side parts of the outer peripheral surfaces of stator core 16 and front support member 18, and a second part 42 integrally connected to the front axial end of the first part 40 for covering the openings of the through holes 26 and surface adjacent them at the front (left in FIG. 1) axial end of the front support member 18.

The first part 40 includes a top plate 44 and a pair of side plates 46, these plates 44, 46 being adapted to extend generally parallel to the outer peripheral surfaces of stator core 16 and front support member 18. The top plate 44 is provided at the rear (right in FIG. 1) axial free end thereof, opposite to the second part 42, with an attachment tab 48 which extends downward and rearward and is bent into generally L-shape. The attachment tab 48 can be abutted at the lower portion thereof, which extends parallel to the top plate 44, onto the top surface of the rear support member 20 (see FIG. 1). Then, the eye bolts 38 (FIG. 1) are respectively inserted through a hole 45 formed in the top plate 44 and a hole 49 formed in the tab 48, so as to be screwed into respective threaded bores (not shown) formed in the front and rear support members 18, 20.

On the other hand, the side plates 46 are provided at the lower free ends thereof with supporting tabs 50 which extend radially inward at the generally right angle to the side plates 46. The supporting tabs 50 can be abutted at the radial inner edges thereof onto the side surfaces of the stator core 16 and the front support member 18 (see FIG. 2). Consequently, when the covering member 34 is fixed at a predetermined effective position by the eye bolts 38, a part of the cavity 36 having a height corresponding to the height of the attachment tab 48 or supporting tabs 50 is defined between the first part 40 and the outer peripheral surfaces of the stator core 16 and front supporting member 18. It should be noted that the top plate 44 of the first part 40 may be provided with a plurality of columns 52 (see FIG. 3) projecting from the inside of the top plate for maintaining the cavity 36 in its proper dimension between the top plate and the outer peripheral surface of the stator core 16.

The second part 42 of the covering member 34 includes an axial end plate 55 integrally extending radially inward from the front edge of the first part 40 and having at the center thereof a generally circular opening 56 for receiving and encircling an axial bulge 54 of the front support member 18, and a supporting tab 58 axially extending in the same direction as the first part 40 from the lower edge of the end plate 55. The supporting tab 58 can be abutted at the axial rear edge thereof onto the axial front end surfaces of the front support member 18 and the bases 22 (see FIG. 1). Consequently, when the covering member 34 is fixed at a predetermined effective position, a remaining part of the cavity 36 having a height corresponding to the height of the supporting tab 58 is defined between he second part 42 and the axial end surface of the front supporting member 18.

In this manner, when the covering member 34 is fixed at the predetermined effective position, the cavity 36 is established so as to open at only the rear axial free end of the first part 40 and to be communicated with the air passages 28 through the through holes 26 of the front support member 18. It should be noted that elastic elements 60 (see FIGS. 1 and 2) such as rubber packings may preferably be interposed between he attachment tab 48, supporting tab 50, opening 56, supporting tab 58 of the covering member 34 and the rear support member 20, stator core 16, front support member 18, bases 22, so as to improve the seal therebetween and to prevent noise caused by vibration.

In the motor 10 with the above-mentioned structure, when the fan or blower (not shown) of the blower unit 30 operates, the ambient air is introduced from the opening of the rear free end of the first part 40 of the covering member 34 into the cavity 36. The introduced air flows forwardly in the cavity 36 and actively absorbs heat from the outer peripheral surfaces of the stator core 16 and the front support member 18, and thereafter is fed into the air passages 28 through the through holes 26 of the front support member 18. The air fed into the air passages 28 flows rearwardly therein and actively absorbs heat from the tubular wall surfaces of the air passages, and thereafter is discharged from the rear end wall of the casing 32 of the blower unit 30 to the exterior of the motor 10. FIG. 1 shows the direction of the air flow by arrows.

As mentioned above, the heat exchange surfaces in the motor 10, lying between the cooling air and the stator core 16 and front support member 18, can be increased, and, thereby, the cooling efficiency of the air-cooling system can be improved. Further, since the outer peripheral surface of the stator core 16 is covered by the covering member 34 and air having relatively a low temperature, i.e., temperature similar to that of the ambient air, the heat radiated from the stator core 16 can be reduced as much as possible.

Figure 6:
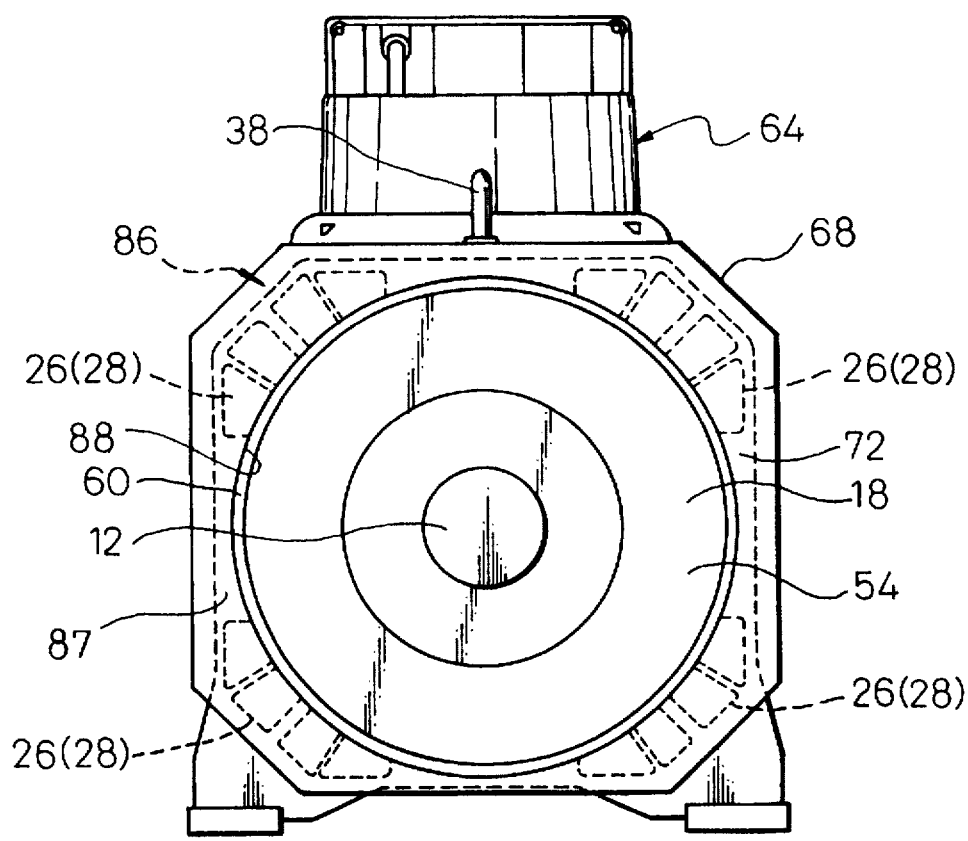
FIG. 6 is an end view of the motor of FIG. 5, showing from an arrow 6 of FIG. 5.
Figure 7:
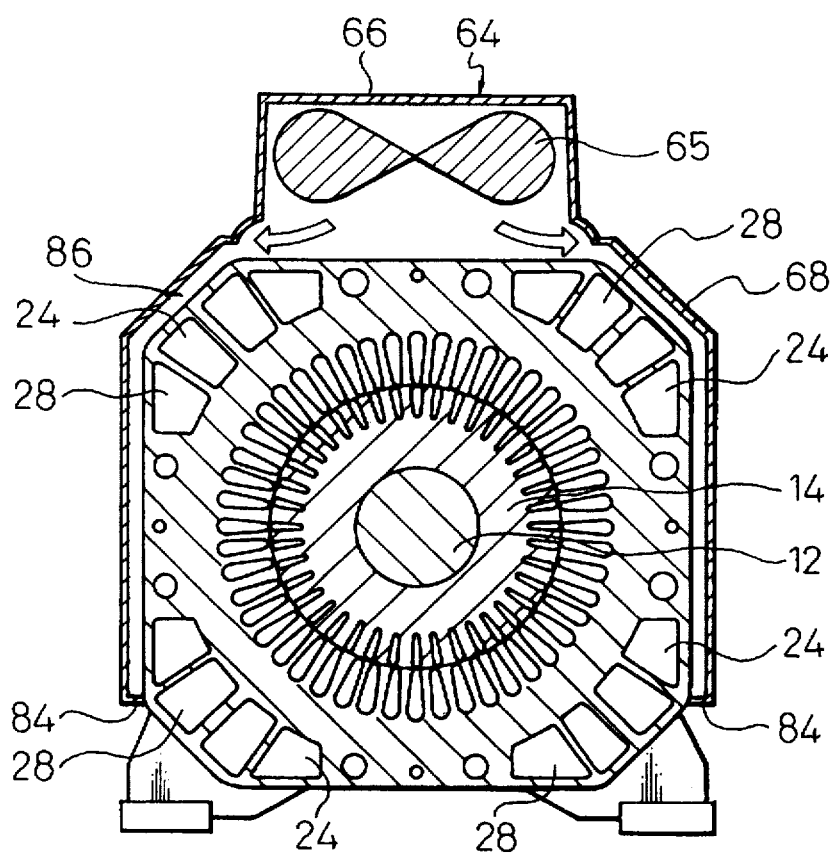
FIG. 7 is a sectional view of the motor of FIG. 5, taken along a line 7—7 of FIG. 5.

FIGS. 5 to 7 show an electric motor 62 with an air-cooling system according to another embodiment of the present invention. The motor 62 has a basic structure similar to that of the motor 10 of FIG. 1, except that a blower unit 64 is arranged on the lateral side (the upper side in the drawings) of a stator. A casing 66 of the blower unit 64 is fixedly connected to a covering member 68 which covers the outer peripheral surface of the stator core 16.

Figure 8:
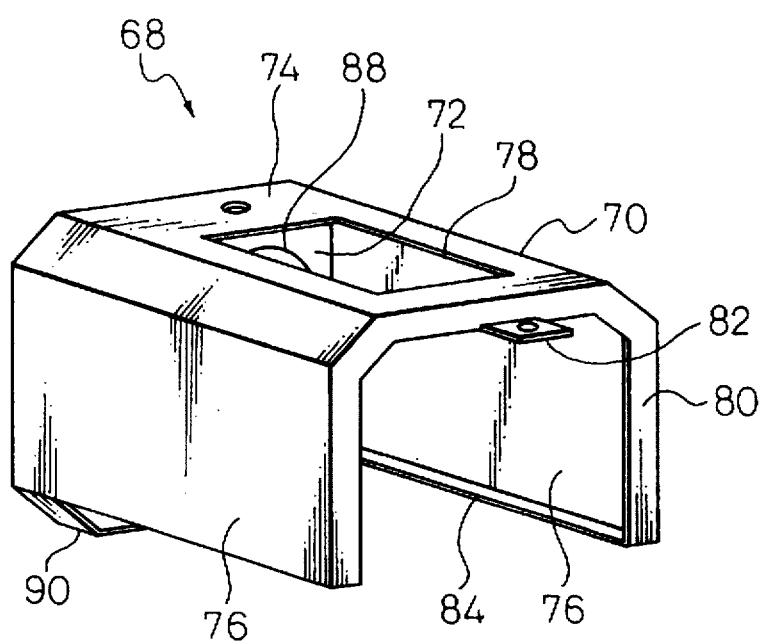
FIG. 8 is a rearside perspective view of a covering member used in the motor of FIG. 5.

As shown in FIG. 8, the covering member 68 includes a first part 70 with a generally U-shape in section for covering the top and side parts of the outer peripheral surfaces of stator core 16 and front support member 18, and a second part 72 integrally connected to the axial front end of the first part 70 for covering the openings of the through holes 26 and surface adjacent them at the front (left in FIG. 5) axial end of the front support member 18.

The first part 70 includes a top plate 74 and a pair of side plates 76, these plates 74, 76 being adapted to extend generally parallel to the outer peripheral surfaces of stator core 16 and front support member 18. The top plate 74 is provided with an opening 78 which faces a fan 65 (FIG. 7) of a blower unit 64. The top plate 74 and the side plates 76 are provided at the rear axial free ends thereof, opposite to the second part 72, with a supporting tab 80 which extends radially inward and generally at a right angle to these plates 74, 76. Particularly, a part of the supporting tab 80, which extends from the top plate 74, is provided at the free end thereof with an attachment tab 82 for being engaged with an eyebolt 38. The supporting tab 80 can be abutted at the radial inner edge thereof onto the top and side surfaces of the stator core 16.

On the other hand, the side plates 76 are provided at the lower free ends thereof with supporting tabs 84 which extend radially inward at a right angle to the side plates 76. The supporting tabs 84 can be abutted at the radial inner edges thereof onto the side surfaces of stator core 16 and front support member 18 (see FIG. 7). Consequently, when the covering member 68 is fixed at a predetermined effective position by the eye bolts 38, a part of the cavity 86 having a height corresponding to the height of the supporting tabs 80, 84 is defined between the first part 70 and the outer peripheral surfaces of stator core 16 and front supporting member 18.

The second part 72 of the covering member 68 includes, similarly to the covering member 34 of FIG. 1, an axial end plate 87 integrally extending radially inward from the front edge of the first part 70 and having at the center thereof a generally circular opening 88 for receiving and encircling an axial bulge 54 of the front support member 18, and a supporting tab 90 axially extending in the same direction as the first part 70 from the lower edge of the end plate 87. The supporting tab 90 can be abutted at the axial rear edge thereof onto the axial front end surfaces of front support member 18 and bases 22. Consequently, when the covering member 68 is fixed at a predetermined effective position, a remaining part of the cavity 86 having a height corresponding to the height of the supporting tab 90 is defined between he second part 72 and the axial end surface of the front supporting member 18.

In this manner, when the covering member 68 is fixed at the predetermined effective position, the cavity 86 is established so as to communicate the blower unit 64 with the through holes 26 of the front support member 18 without opening to the exterior of the motor 62. It should be noted that elastic elements 60 (see FIG. 6) such as rubber packings may preferably be interposed between the supporting tab 80, attachment tab 82, opening 88, supporting tab 90 of the covering member 68 and the rear support member 20, stator core 16, front support member 18, bases 22, so as to improve a seal therebetween and to prevent noise caused by vibration.

In the motor 62 with the above-mentioned structure, when the fan or blower (not shown) of the blower unit 64 operates, the ambient air is drawn from the top end of the casing 66 of the blower unit 64 and is introduced into the cavity 86 between the stator core 16 and the covering member 68. The introduced air flows downwardly and forwardly in the cavity 86 and actively absorbs heat from the outer peripheral surfaces of stator core 16 and front support member 18, and thereafter is fed into the air passages 28 through the through holes 26 of the front support member 18. The air fed into the air passages 28 flows rearwardly therein and actively absorbs heat from the tubular wall surfaces of the air passages, and thereafter is discharged from the rear axial end wall (preferably, a perforated wall) of the rear support member 20 to the exterior of the motor 10. FIGS. 5 and 7 show the direction of air flow by arrows.

As mentioned above, the heat exchange surfaces in the motor 62, lying between the cooling air and the stator core 16 and front support member 18, can also be increased, thereby the cooling efficiency of the air-cooling system can be improved. Further, since the outer peripheral surface of the stator core 16 is covered by the covering member 68 and the air having relatively low temperature, i.e., temperature similar to that of the ambient air, the heat radiated from the stator core 16 can be reduced as much as possible. Advantageously, the arrangement of the blower unit 64 at the lateral side of the stator can reduce the axial length of the motor. Therefore, even when a short motor is required, the air-cooling efficiency of such a motor can be improved.

The covering member in the air-cooling system according to the present invention may have various shapes and dimensions. For example, when the present invention is applied to an electric motor with no base, which may by mounted to an objective machine frame through a flange provided to a front support member, the covering member may preferably be formed into a shape enabling the covering member to cover generally entirely the outer peripheral surface of the stator core. Also, the covering member may be made of various materials, such as metals or resins. Especially, resinous materials with low heat conductivity is preferably used, so as to effectively reduce heat radiation from a stator.

As will be understood from the foregoing description of the preferred embodiments, an electric motor with an air-cooling system according to the present invention includes a covering member which is fixed to the stator and at least partially covering an outer peripheral surface of the stator core so as to define a cavity, and an ambient air is introduced into the cavity and flows from the cavity into the air passages to absorb heat generated in the stator and then is discharged from the air passages out of the motor. Therefore, the heat exchange surface lying between the air and the stator core can be easily increased without increasing the number or sectional areas of air passages, whereby the air-cooling efficiency can be remarkably improved. Further, since the outer peripheral surface of the stator core is covered by the covering member and an air having a relatively low temperature, the heat radiated from the stator core can be reduced. Therefore, in accordance with the present invention, the temperature rise of the motor being running can be effectively restricted by air cooling, and thus the power rating of the motor can be further improved.

While the invention has been particularly shown and described with reference to preferred embodiments thereof, it will be understood by those skilled in the art that various changes and modifications may be made without departing from the spirit and scope of the invention. The scope of the invention is therefore to be determined solely by the following claims.

We claim:

1. An electric motor with an air-cooling system, comprising:

a rotor;

a stator having a stator core encircling said rotor with a gap being defined therebetween;

a plurality of air passages formed directly in said stator core and extending generally axially along an outer periphery of the stator core;

a covering member fixed to said stator and at least partially covering an outer peripheral surface of said stator core so as to define a cavity at least partially encircling said stator core in fluidic communication with said air passages; and a blower unit disposed at one end of the motor to allow for blowing ambient air, surrounding said motor, into said cavity, whereby the air flows from said cavity into said air passages to absorb heat generated in said stator and then is discharged from said air passages out of the motor.

2. An electric motor as set forth in claim 1, wherein said cavity defined between said stator core and said covering member opens to an exterior of said motor at only a position adjacent to a rear axial end of said stator core and is communicated with said air passage at a position adjacent to a front axial end of said stator core, whereby the air flows from a rear axial end of said cavity to a front axial end of said air passages and then is discharged from a rear axial end of said air passages.

3. An electric motor as set forth in claim 1, wherein an elastic element is interposed between said stator and said covering member.

4. An electric motor as set forth in claim 1, wherein said stator includes a pair of supporting members arranged at respective axial ends of said stator core, said supporting members being provided with axially extending through holes in fluidic communication with respective said air passages, so that said cavity is communicated with said air passages through said through holes of one of said supporting members.

5. An electric motor as set forth in claim 1, wherein said blower unit is disposed at a lateral side of said motor and is fixedly carried by said covering member.

* * * * *